US012457461B2

(12) United States Patent
Borra et al.

(10) Patent No.: US 12,457,461 B2
(45) Date of Patent: Oct. 28, 2025

(54) REMOVABLE BATTERY DESIGNS FOR CUSTOM HEARING INSTRUMENTS

(71) Applicant: Starkey Laboratories, Inc., Eden Prairie, MN (US)

(72) Inventors: Ganesh Borra, Plymouth, MN (US); Joseph Matthias Reis, Jr., Minneapolis, MN (US); Ryan Owens, Hopkins, MN (US); Mark Allen Pankratz, Bloomington, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 262 days.

(21) Appl. No.: 18/181,361

(22) Filed: Mar. 9, 2023

(65) Prior Publication Data

US 2023/0336929 A1 Oct. 19, 2023

Related U.S. Application Data

(60) Provisional application No. 63/363,044, filed on Apr. 15, 2022.

(51) Int. Cl.
*H04R 25/00* (2006.01)

(52) U.S. Cl.
CPC ....... *H04R 25/602* (2013.01); *H04R 2225/51* (2013.01)

(58) Field of Classification Search
None
See application file for complete search history.

(56) References Cited

U.S. PATENT DOCUMENTS

| | | | | |
|---|---|---|---|---|
| 4,069,400 A | | 1/1978 | Johanson et al. | |
| 4,585,089 A | * | 4/1986 | Topholm ................ | H04R 25/65<br>381/328 |
| 4,870,688 A | | 9/1989 | Voroba et al. | |
| 5,781,637 A | | 7/1998 | Heide et al. | |
| 7,321,663 B2 | | 1/2008 | Olsen | |

(Continued)

FOREIGN PATENT DOCUMENTS

| | | |
|---|---|---|
| EP | 1287721 B1 | 7/2005 |
| EP | 1287721 B2 | 8/2009 |

(Continued)

OTHER PUBLICATIONS

"Big and beige is no longer an option", Starkey, Retrieved from: https://www.starkey.com/hearing-aids/styles/in-the-ear. Accessed on: Apr. 8, 2022, 4 pp.

*Primary Examiner* — Walter F Briney, III

(74) *Attorney, Agent, or Firm* — Shumaker & Sieffert, P.A.

(57) ABSTRACT

A hearing instrument may comprise a housing that defines a cavity, wherein the housing includes an inner side that is formed to conform with user anatomy, an outer side that is externally visible when the hearing instrument is placed within an ear of a user. The hearing instrument may further comprise circuitry disposed inside the cavity, wherein the circuitry includes an antenna disposed adjacent an inner surface of the outer side of the housing. A battery door may be attached to the housing, wherein the battery door is positioned such that a battery can be inserted and removed via the battery door, wherein upon insertion of the battery into the hearing instrument, the battery is disposed behind the antenna relative to the outer side of the housing.

19 Claims, 18 Drawing Sheets

(56) References Cited

U.S. PATENT DOCUMENTS

| | | | | |
|---|---|---|---|---|
| 8,055,002 | B2 | 11/2011 | Fideler | |
| 8,467,556 | B2 | 6/2013 | Shennib et al. | |
| 8,855,345 | B2 | 10/2014 | Shennib et al. | |
| 9,319,817 | B2 | 4/2016 | Baer et al. | |
| 11,563,233 | B1 | 1/2023 | Howard et al. | |
| 2005/0232453 | A1* | 10/2005 | Fideler | H04R 25/604 381/328 |
| 2006/0239483 | A1 | 10/2006 | Orts et al. | |
| 2010/0158294 | A1* | 6/2010 | Helgeson | H04R 25/609 381/323 |
| 2014/0334651 | A1* | 11/2014 | Higgins | H04R 25/654 381/323 |
| 2018/0124528 | A1* | 5/2018 | Polinske | H04R 25/602 |

FOREIGN PATENT DOCUMENTS

| | | | |
|---|---|---|---|
| TW | 1493984 | B | 7/2015 |
| WO | 2006117407 | A2 | 11/2006 |

* cited by examiner

REMOVABLE BATTERY DESIGNS FOR CUSTOM HEARING INSTRUMENTS

This application claims the benefit of U.S. Provisional Patent Application 63/363,044, filed Apr. 15, 2022, the entire content of which is incorporated by reference.

TECHNICAL FIELD

This disclosure relates to hearing instruments, and more specifically, hearing instruments that are powered by a removable battery.

BACKGROUND

Hearing instruments are devices designed to be worn on, in, or near one or more of a user's ears. Common types of hearing instruments include hearing assistance devices (e.g., "hearing aids"), earbuds, headphones, hearables, cochlear implants, and other devices designed for placement inside or in close proximity to an ear canal of a wearer. Some hearing instruments include additional features beyond just environmental sound-amplification. For example, some modern hearing instruments include advanced audio processing for improved device functionality, controlling and programming the devices, and beamforming, and some can even communicate wirelessly with external devices.

Some hearing instruments are customized, e.g., formed to conform with user anatomy. For example, hearing instruments can be formed by scanning the shape of an ear canal of a user (i.e., a patient), and then forming or printing a hearing instrument housing to have a shape that precisely conforms to the ear of the user.

Hearing instruments generally have limited space for various circuit components within the housing. Layout and arrangement of the components within hearing instruments may improve operational performance and user satisfaction.

SUMMARY

This disclosure describes various mechanical designs and features for hearing instruments. The hearing instrument layout of this disclosure may help to ensure that an antenna is positioned as far out as possible from the user, while still remaining inside of the hearing instrument housing. Such a design, however, may present challenges for battery placement, especially for replaceable batteries that may be periodically removed and replaced within the hearing instrument. This disclosure describes several features, such as a battery door and other components, to facilitate battery placement behind the antenna. For example, the battery door may be designed and positioned in a specific location that still allows for battery cycling (e.g., removal and replacement) while the hearing instrument is being worn and used. Several other features are also described, which help facilitate the desired location of the antenna and the battery and may provide additional benefits to the packaging of components within the hearing instrument.

In one example, this disclosure describes a hearing instrument comprising: a housing that defines a cavity, circuitry disposed inside the cavity, and a battery door attached to the housing. The housing includes an inner side that is formed to conform with user anatomy and an outer side that is externally visible when the hearing instrument is placed within an ear of a user. The circuitry may include an antenna disposed adjacent an inner surface of the outer side of the housing. The battery door may be positioned such that a battery can be inserted and removed via the battery door, wherein upon insertion of the battery into the hearing instrument, the battery is disposed behind the antenna relative to the outer side of the housing.

The details of one or more techniques of the disclosure are set forth in the accompanying drawings and the description below. Other features, objects, and advantages of the techniques described in this disclosure will be apparent from the description, drawings, and claims.

DETAILED DESCRIPTION

Figure 1:
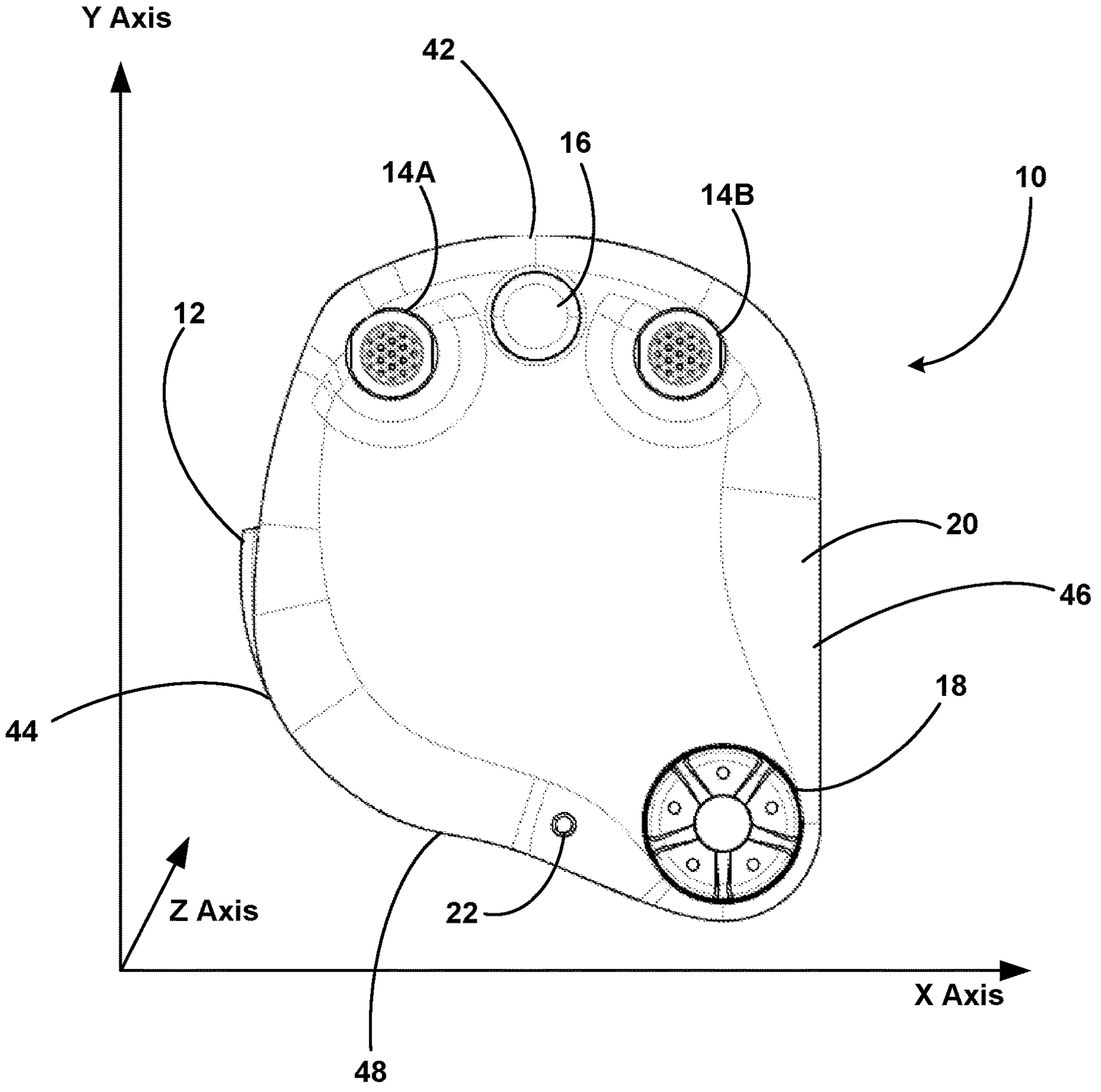
FIG. 1 is a front view of a hearing instrument consistent with this disclosure and including a coordinate system to show the general orientation of the hearing instrument when placed in the ear of a user.
Figure 2:
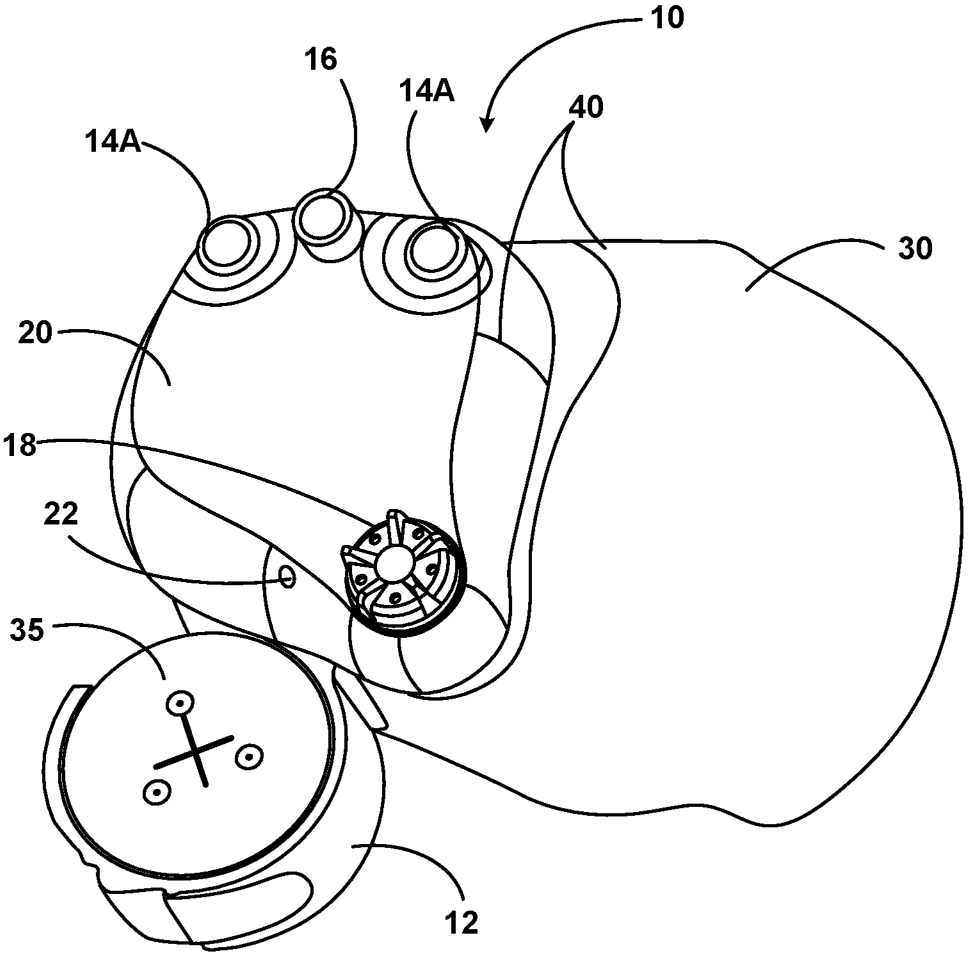
FIGS. 2-4 are perspective views of a hearing instrument consistent with this disclosure.
Figure 3:
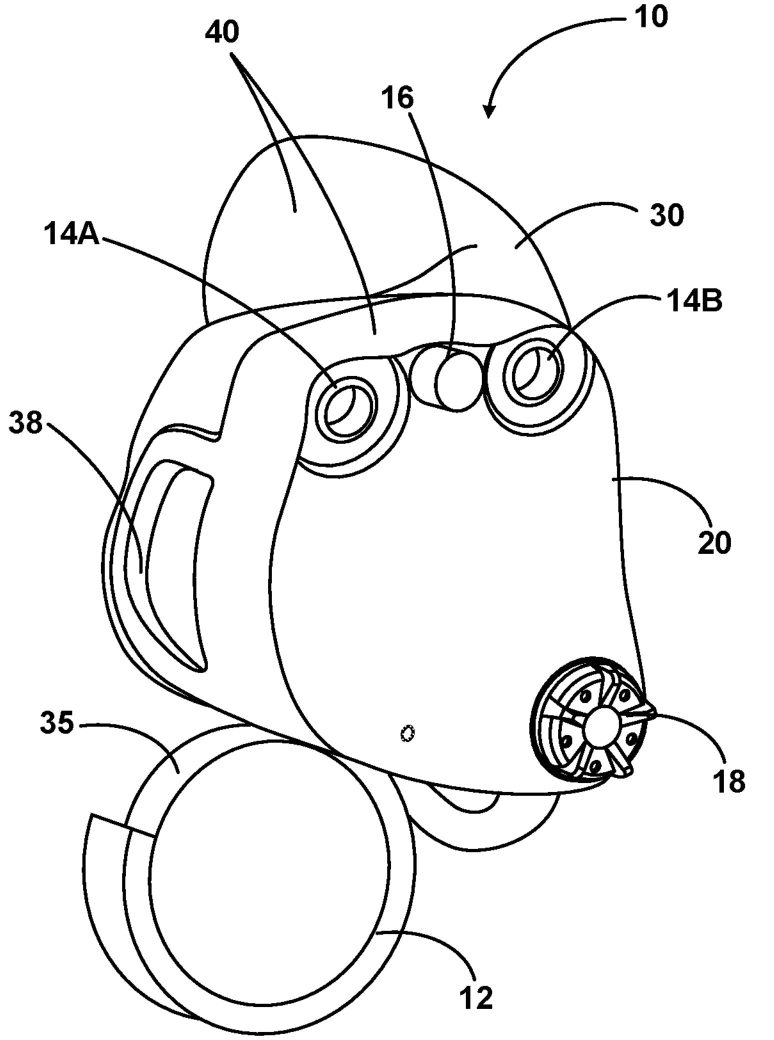
Figure 4:
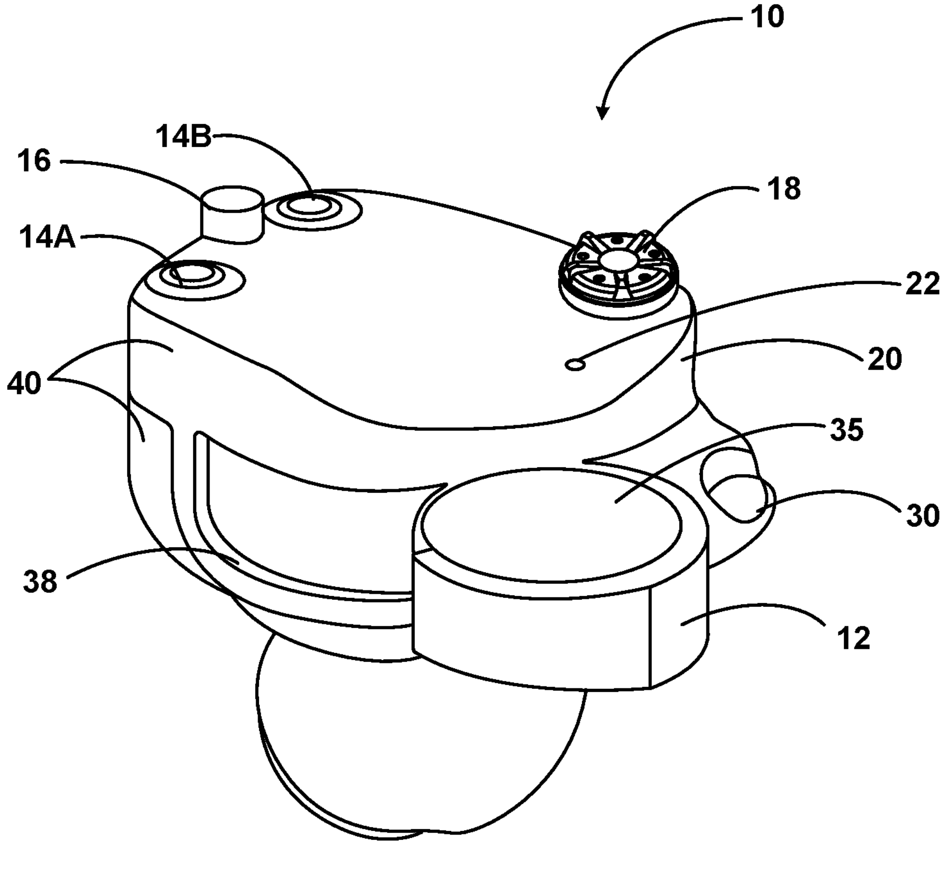
Figure 5:
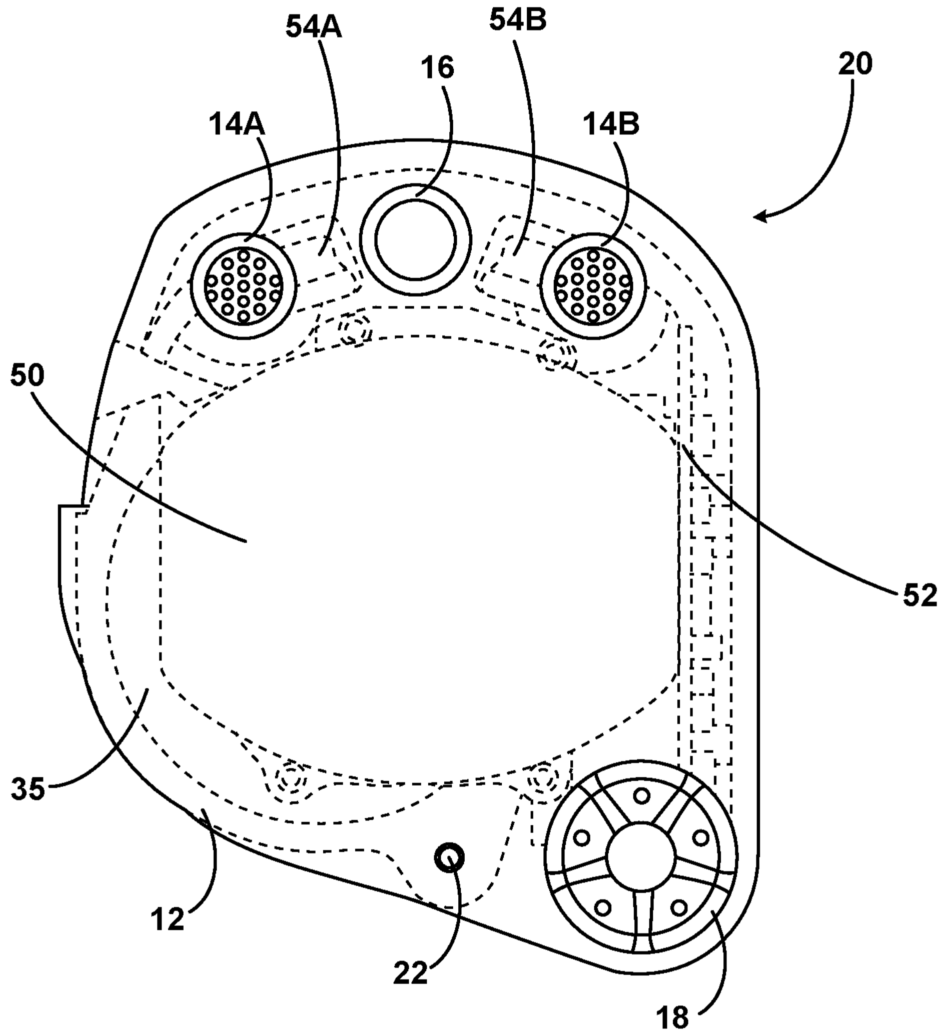
FIGS. 5 and 6 are front views of an outer side of a hearing instrument showing a housing in a partially translucent manner so that some of the internal components are visible inside of the housing.
Figure 6:
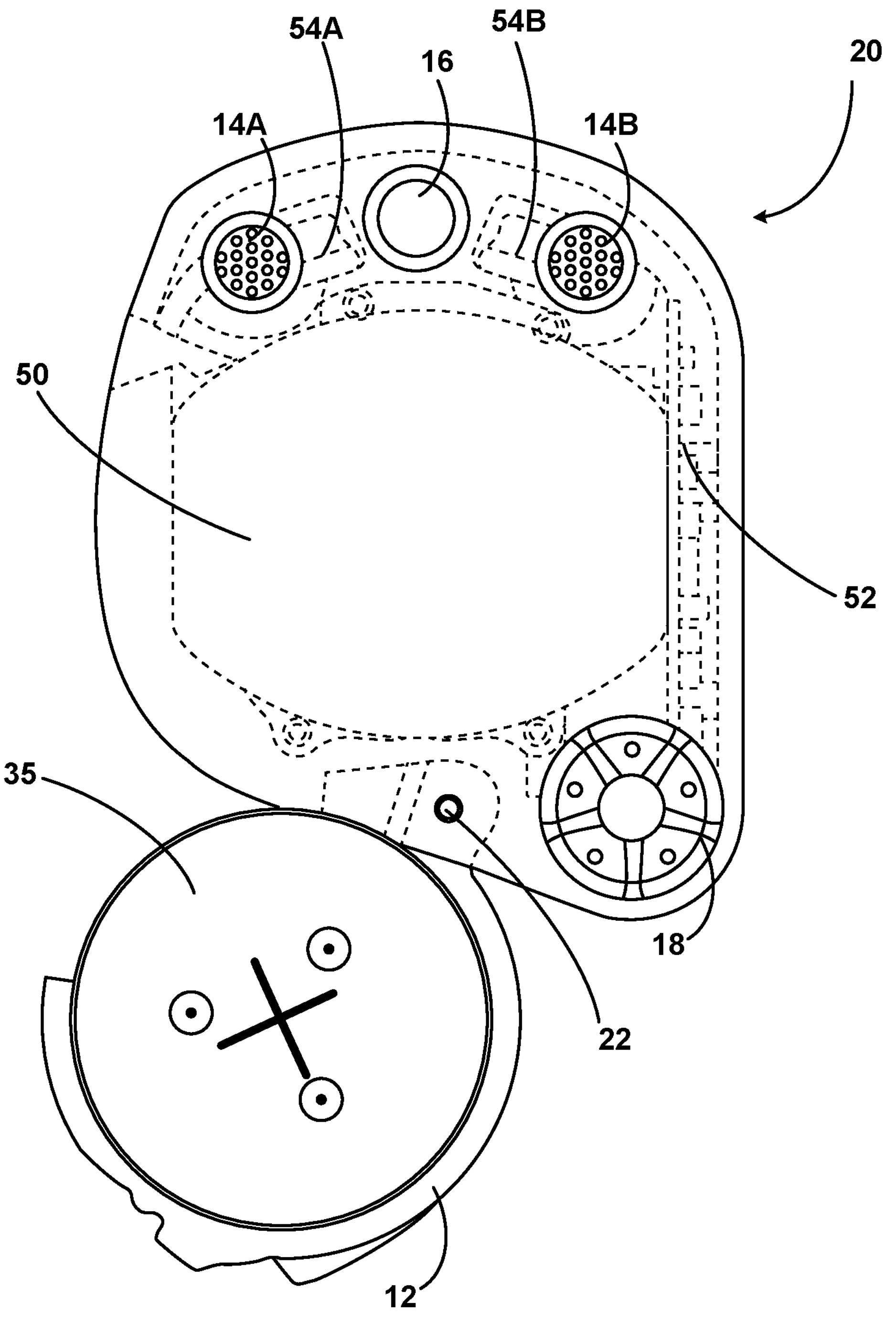
Figure 7:
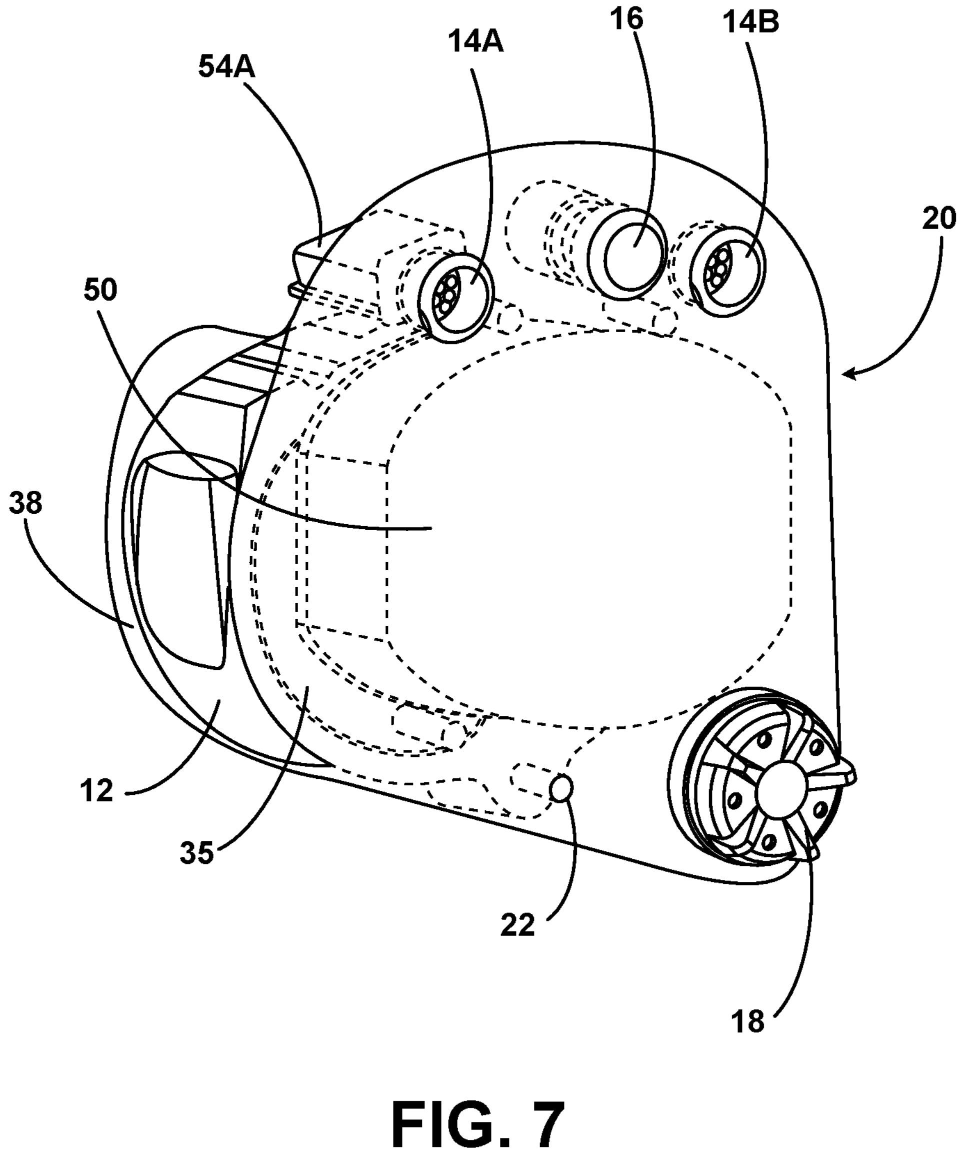
FIGS. 7 and 8 are perspective views of an outer side of a hearing instrument showing a housing in a partially translucent manner so that some of the internal components are visible inside of the housing.

Wireless communication links are becoming increasingly desirable for hearing instruments, such as hearing aids. A hearing instrument may use wireless communication links to communicate with other hearing instruments or with other types of devices, such as mobile phones or hearing instrument accessories. Such communication may serve a wide variety of purposes, such as streaming media data and sending sensor data.

A hearing instrument typically includes an antenna in order to perform wireless communication. In part because of the small sizes of hearing instruments and the limited storage capacities of the batteries of hearing instruments, designing antennas and positioning antennas within hearing instruments is challenging. This is especially the case with respect to completely-in-canal (CIC) hearing instruments, In-The-Canal (ITC) hearing instruments, In-The-Ear (ITE) hearing instruments, and Invisible-In-The-Canal (IITC) hearing instruments. Because such hearing instruments are compact in size and may be fully located inside a user's ear or ear canal, antennas for such hearing instruments may suffer from head loading or other attenuation. Head loading is the attenuation of electromagnetic signals by the user's head. The problem of head loading may be especially pronounced in 2.4 GHz antennas used for Bluetooth Low Energy (BLE) radio applications.

In some examples, this disclosure describes antennas suitable for use in hearing instruments, especially ITC hearing instruments and ITE hearing instruments. For example, the antenna designs of the disclosure may be suitable for use in hearing instruments with radio applications in the 2.4 GHz band. Such antennas may define a planar shape. For example, an antenna for hearing instruments that is useful for radio applications in the 2.4 GHz band may comprise a planar inverted-F antenna (PIFA), and the antenna is configured to send or receive wireless signals in a frequency band that includes 2.4 Gigahertz.

The hearing instrument layout of this disclosure may help to ensure that an antenna is positioned as far out as possible from the user, while still remaining inside of the hearing instrument housing. Such a design may improve antenna performance and may help to reduce head loading relative to antennas placed further inside the housing of the hearing instrument. However, this type of antenna placement in the housing of a hearing instrument may present challenges for battery placement, especially for replaceable batteries that may be periodically removed and replaced within the hearing instrument.

This disclosure describes several features for hearing instrument housing design and circuit layout, such as a battery door and other components, to facilitate battery placement behind the antenna. For example, the battery door may be designed and positioned in a specific location that still allows for battery cycling (e.g., removal and replacement) while the hearing instrument is being worn and used. Several other features are also described, which help facilitate the desired location of the antenna and the battery and may provide additional benefits to the packaging of components within the hearing instrument.

FIG. 1 is a front view of a hearing instrument 10 consistent with this disclosure and including a coordinate system to show the general orientation of the hearing instrument when placed in the ear of a user. A user may wear hearing instrument 10 within the ear of the user. As described in greater detail below, hearing instrument 10 may comprise a two-part construction that includes an inner side (not shown in FIG. 1) and an outer side 20. A first piece of a housing of hearing instrument 10 includes the outer side 20 and a battery door 12, which may be disposed in a specific location 44 to ensure that the battery is positioned behind an antenna, e.g., behind the antenna in the Z-axis direction relative to a front surface of hearing instrument 10. A second piece of the housing (not shown in FIG. 1) defines the inner side (not shown in FIG. 1) that is formed to conform with the user anatomy. The first piece and the second piece are affixed to form the housing of hearing instrument 10.

The shape of the inner side of hearing instrument 10 conforms with user anatomy for placement inside the ear of a user such that hearing instrument 10 is generally oriented as shown in FIG. 1 when being worn by the user. The inner side (not shown in FIG. 1) may be formed using injection molding, cutting and buffing, or three-dimensional (3D) printing, based on a scan or mold of the ear of the user such that hearing instrument 10 only fits inside the ear of the user in the general orientation shown in FIG. 1. Thus, battery door 12 may be disposed at a specific location 44 that is proximate a posterior portion of the ear of the user and outside of a concha. When placed in the user's ear, a front side 46 of the outer side 20 may be positioned proximate to the tragus of the user without extending beyond the tragus. Thus, the front side 46 of the outer side 20 may be positioned inside the bowl of the ear, while location 44 may extend from the bowl.

Moreover, by positioning battery door 12 along an edge of hearing instrument 10, e.g., an edge that is perpendicular to a planar antenna inside the housing of hearing instrument 10, the battery can be positioned inside of hearing instrument 10 behind the antenna (not shown in FIG. 1). In this way, the antenna comprises the outward most component inside the housing. In other words, when a battery is inserted into battery door 12, the battery is disposed behind the antenna relative to the outer side 20 of the housing. Put another way, the battery is disposed behind the antenna in the direction of the Z-axis shown in FIG. 1. This design can also help avoid any need to widen outer side 20 in order to accommodate the battery.

In some instances, the user may wear a single hearing instrument 10. In other instances, the user may wear two hearing instruments, with one hearing instrument for each ear of the user. Hearing instruments for the left and right ear may have a mirrored design relative to each other, for placement in the different ear canals. Of course, hearing instruments for the left and right ear may also exhibit differences relative to one another, e.g., if the ears of the user exhibit anatomical differences in shape of the ear or the ear canal shape.

Hearing instrument 10 may comprise any of a wide variety of devices that are configured to provide auditory stimuli to a user and that are designed for wear and/or implantation at, on, or near an ear of the user. Hearing instruments 10 may be worn, at least partially, in the ear canal or concha. Hearing instrument 10, for example, may comprise a so-called ITC hearing instrument, an ITE hearing instrument, or another hearing instrument that is designed for insertion in the ear of a user while being visible by others when the hearing instrument is being worn.

In any of the examples of this disclosure, hearing instrument 10 may comprise a hearing assistance device. Hearing assistance devices include devices that help a user hear sounds in the user's environment. In some examples, hearing instrument 10 comprises an over-the-counter device, a direct-to-consumer device, or a prescription device. Furthermore, in some examples, hearing instrument 10 may further include capabilities to provide auditory stimuli to the user that correspond to artificial sounds or sounds that are not naturally in the user's environment, such as recorded music, computer-generated sounds, or other types of sounds. Some types of hearing instruments provide auditory stimuli to the user corresponding to sounds from the user's environmental and also artificial sounds. In some examples, hearing instrument 10 may provide auditory stimuli to the user via a bone conduction pathway.

The following discussion refers generally to various component labeled in FIGS. 1-21, where like numerals are used to identify the same components in the different FIGS. Some of the description refers to specific FIGS., but the description generally applies to all of FIGS. 1-21, which show various components and views of hearing instrument 10.

As shown in FIGS. 1-19, hearing instrument 10 may comprise a housing that defines a cavity. The housing includes an inner side 30 that is formed to conform with user anatomy, an outer side 20 that is externally visible when the hearing instrument is placed within the ear of the user.

Circuitry is disposed inside the cavity. The circuitry includes an antenna 50 disposed adjacent an inner surface of the outer side 20 of the housing. Furthermore, a battery door 12 is attached the housing. Battery door 12 is positioned such that a battery 35 can be inserted and removed via battery door 12. Upon insertion of battery 35 into hearing instrument 10, battery 35 is disposed behind antenna 50 relative to the outer side of the housing.

In some examples, when the inner side 30 of hearing instrument 10 is placed within the ear of the user, battery door 12 is disposed proximate a posterior portion of the ear of the user and outside of a concha (e.g., at location 44 shown in FIG. 1)

In some examples, as shown in various FIGS., hearing instrument 10 may include one or more microphone input ports 14A, 14B disposed near a top side 42 of the outer side 20 of the housing. Positioning input ports 14A, 14B near a top side 42 and poisoning battery door 12 proximate to bottom side 48 can help ensure that debris is less likely to infiltrate input ports 14A, 14B when battery door 12 is opened for battery removal or replacement. Microphone input ports 14A, 14B may allow sounds from the environment of the user to reach microphones positioned within the housing of hearing instrument 10.

Moreover, in some examples, hearing instrument 10 may include a functional button 16 disposed near the top side of the outer side of the housing. Functional button 16 may, for example, allow a user to navigate and select various functions or modes for hearing instrument 10. In some examples, hearing instrument 10 may also include a volume control dial 18 disposed near a bottom side 48 of the outer side 20 of the housing. Volume control dial 18, for example, may allow the user to adjust the volume of sound produced by hearing instrument 10.

As mentioned above, hearing instrument 10 may comprise circuitry that includes an antenna, and the antenna may be positioned as far out as possible from the user, while still remaining inside of the housing of hearing instrument 10. Of course, hearing instrument 10 may also include other circuitry as discussed in greater detail below.

In some examples, hearing instrument 10 may include a printed circuit board assembly (PCBA) 52 that includes one or more functional circuits. The functional circuits, for example, may facilitate the functionality of hearing device 10. According to this disclosure, PCBA 52 may be disposed within the cavity of the housing of hearing instrument 10 perpendicular to antenna 50. Antenna 50 may be electrically connected to PCBA 52, and battery 35 may provide power to PCBA 52 when the battery is inserted into the cavity via battery door 12. In addition, circuitry of hearing instrument 10 may further include one or more microphones 54A, 54B disposed within the cavity behind the one or more microphone input ports 14A, 14B. Microphones 54A, 54B are electrically connected to the PCBA 52. Microphones 54A, 54B may comprise so-called microelectromechanical systems (MEMS) microphones or other type of microphones useful for hearing devices. Microphones 54A, 54B may be electrically connected to PCBA 52 via wire harnesses or other electrical connections. In some examples, additional PCBAs can be included within housing 50. An additional PCBA, for example, may be used define interfaces to PCBA 52 or to distribute PCBA components in several different boards.

In some examples, battery door 12 comprises a tray 62. Battery 35 can be positioned in tray 62 when battery door 12 is opened. This is depicted in several FIGS. and shown well in FIGS. 8 and 19. A tray design for battery door 12 can help to ensure proper battery insertion when batteries are cycled into hearing instrument 10. To cycle battery 35, for example, a user may open door 12 to expose tray 62, replace battery 35, and then close door 12 to insert tray 62 into the cavity so as to position battery 35 behind antenna 50. In some examples, battery door 12 snap-fits into slot 38 of outer side 20 of housing 40, and a user can open battery door 12, which rotates open to expose tray 62. Battery 35 may comprise a generally flat and cylindrical-shaped battery that defines a cylinder with a radius and a height, wherein the radius is more than twice the length of the height.

Figure 8:
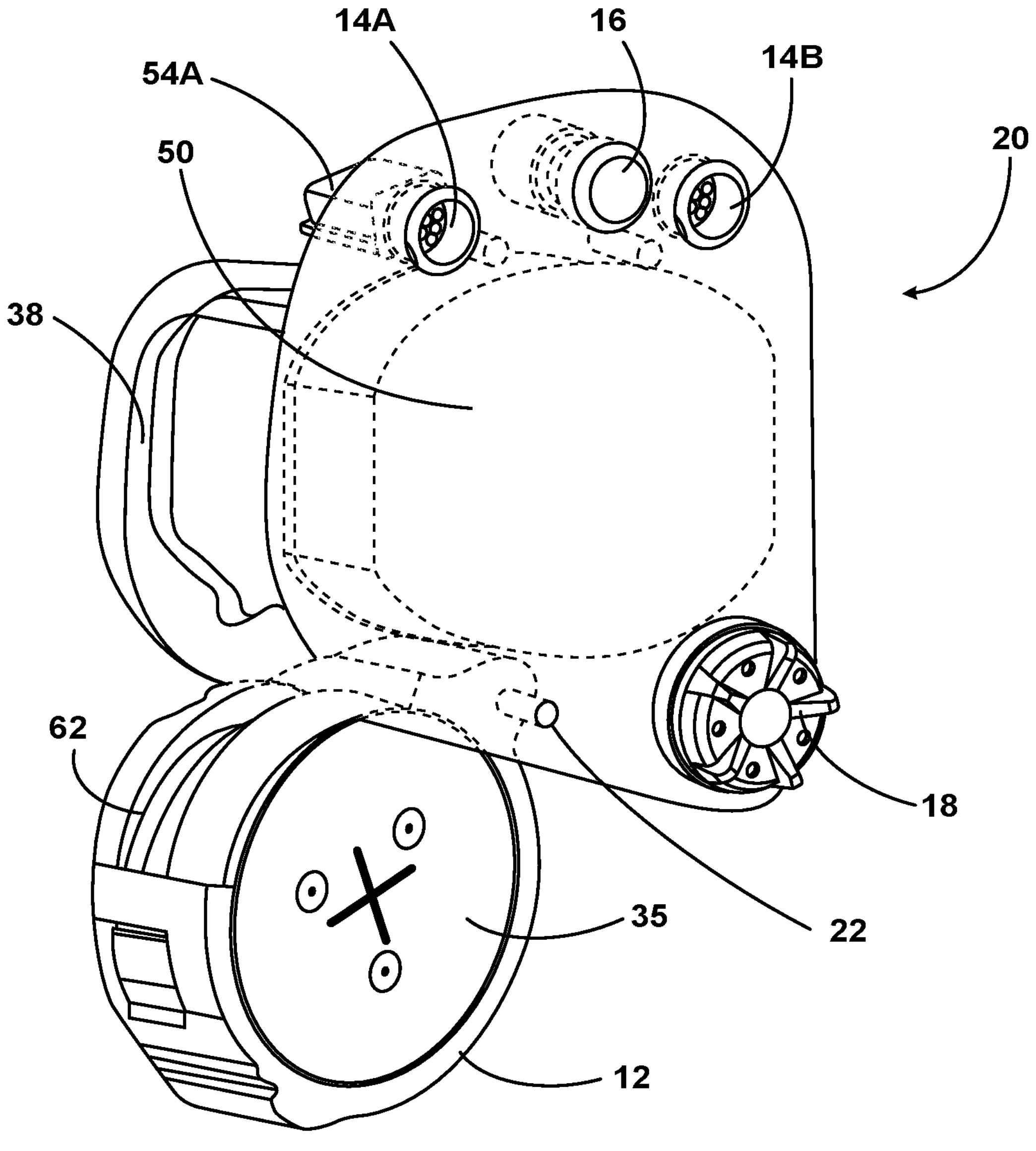
Figure 9:
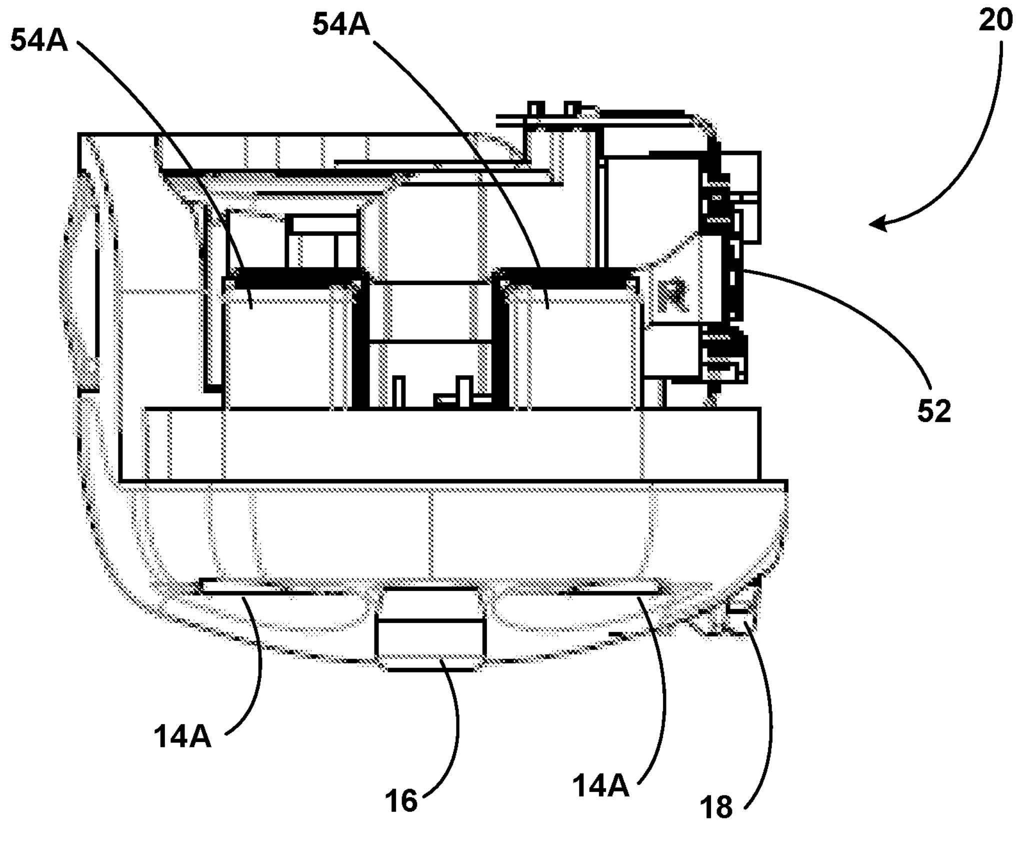
FIG. 9 is a top view of an outer side of a hearing instrument consistent with this disclosure.
Figure 10:
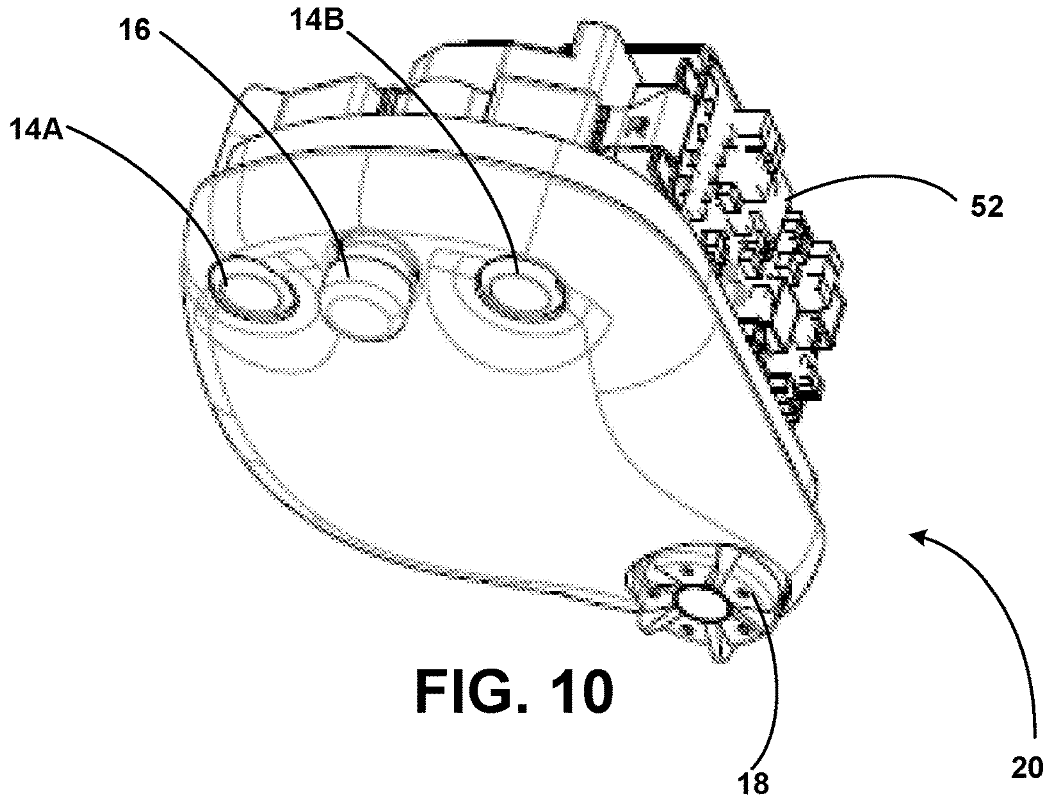
FIGS. 10 and 11 are perspective views of a hearing instrument consistent with this disclosure.
Figure 11:
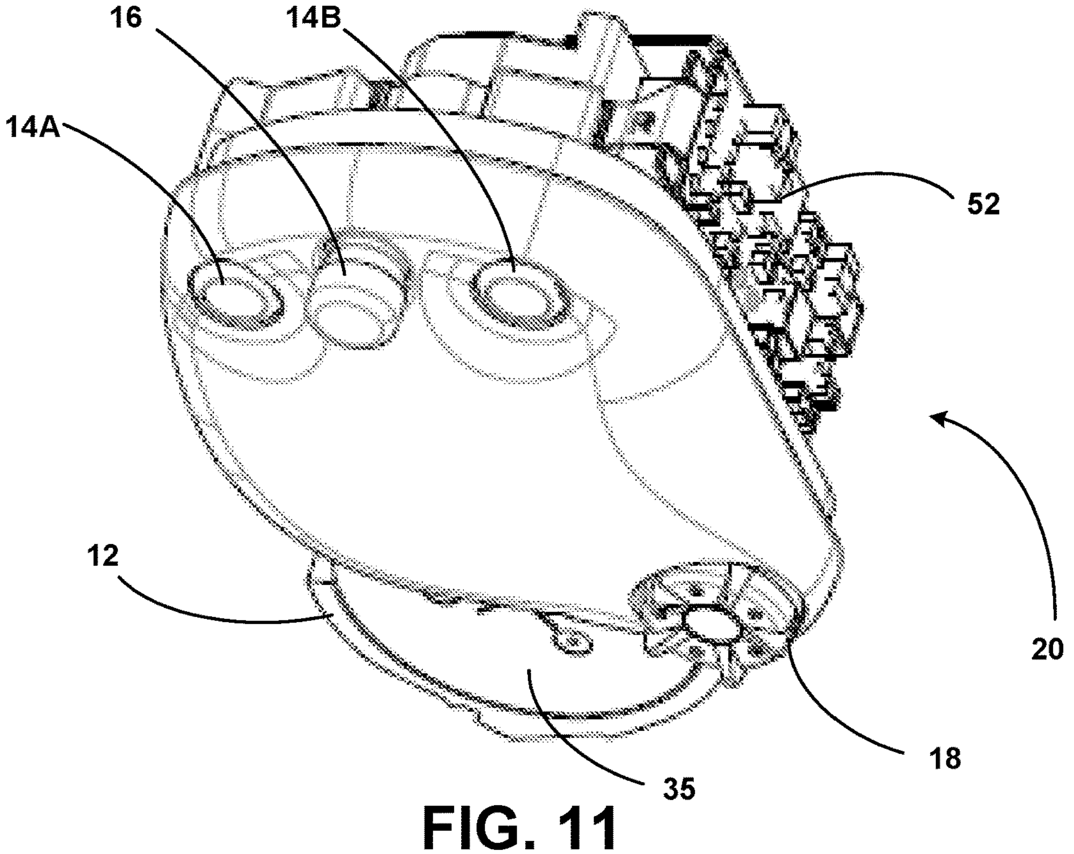
Figure 12:
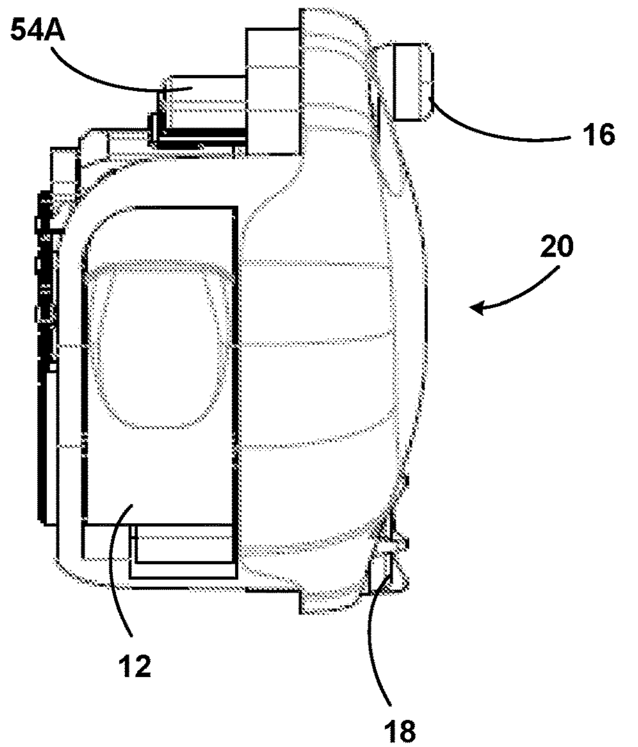
FIGS. 12 and 13 are side views of a hearing instrument consistent with this disclosure.
Figure 13:
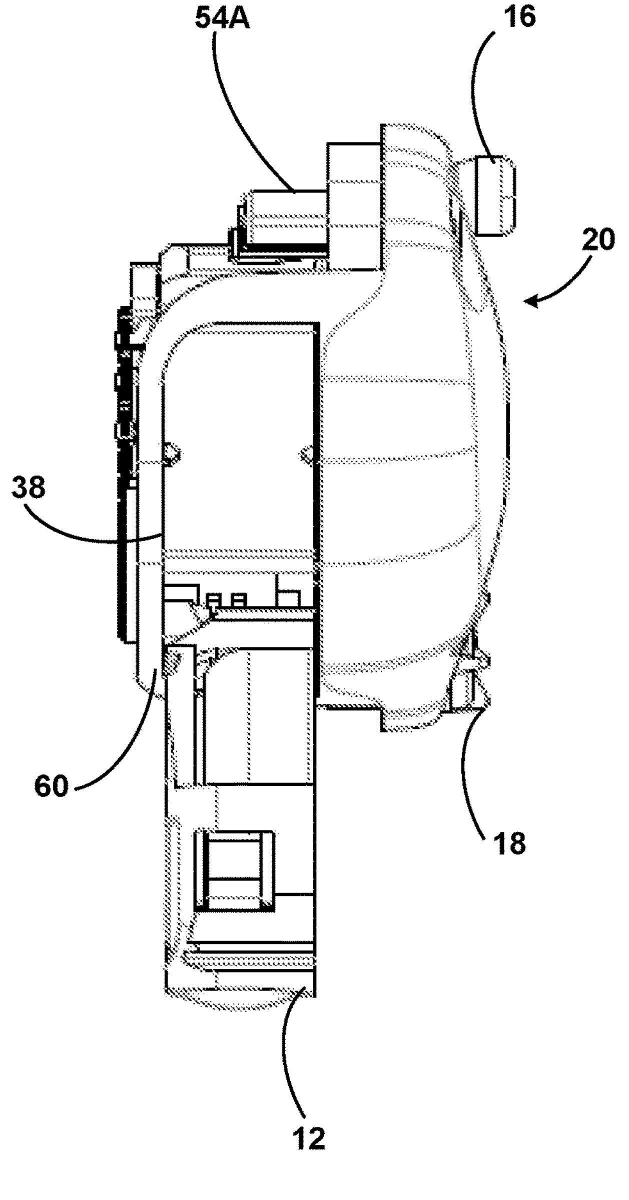
Figure 14:
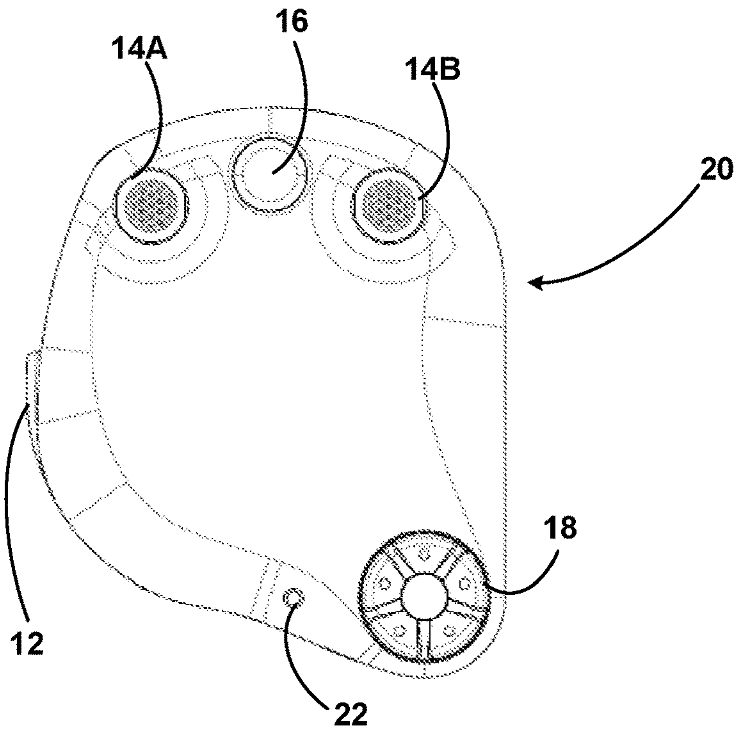
FIGS. 14 and 15 are front views of a hearing instrument consistent with this disclosure.
Figure 15:
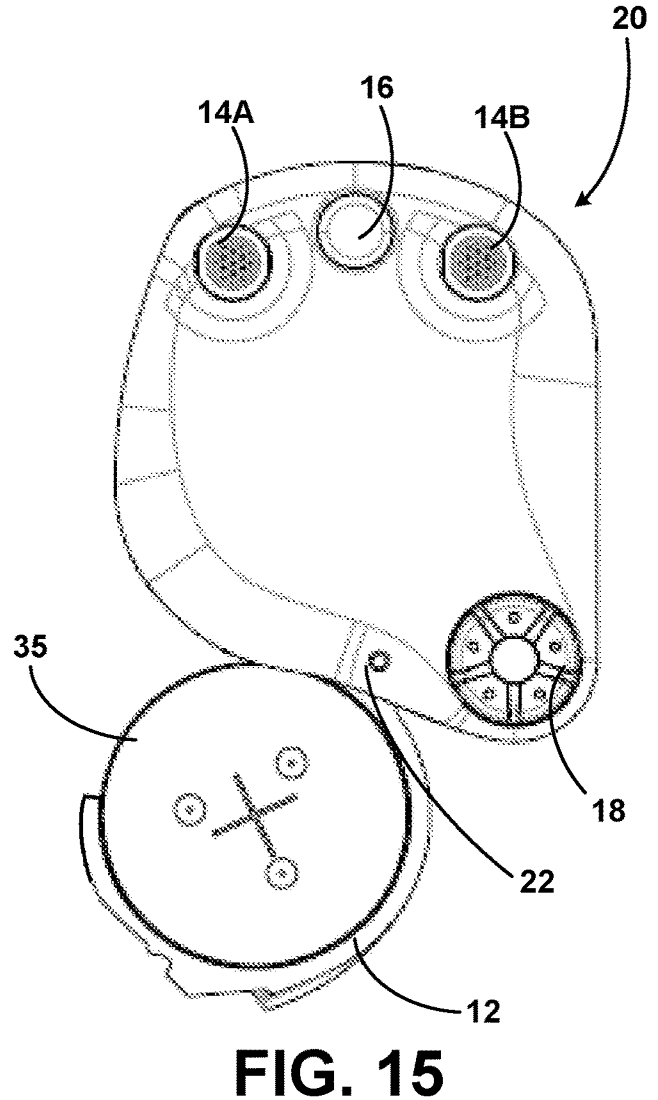
Figure 16:
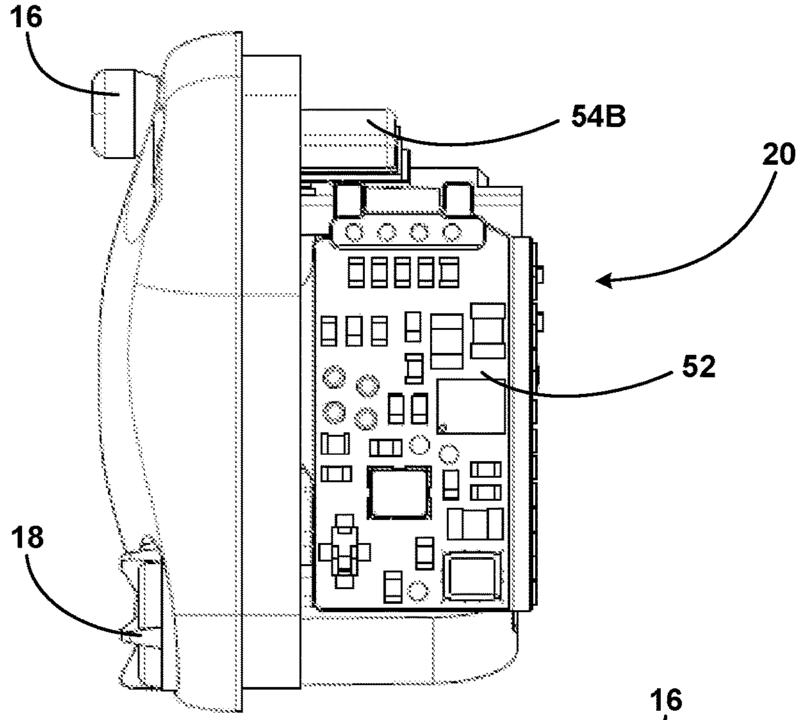
FIGS. 16 and 17 are side views of a hearing instrument consistent with this disclosure.
Figure 17:
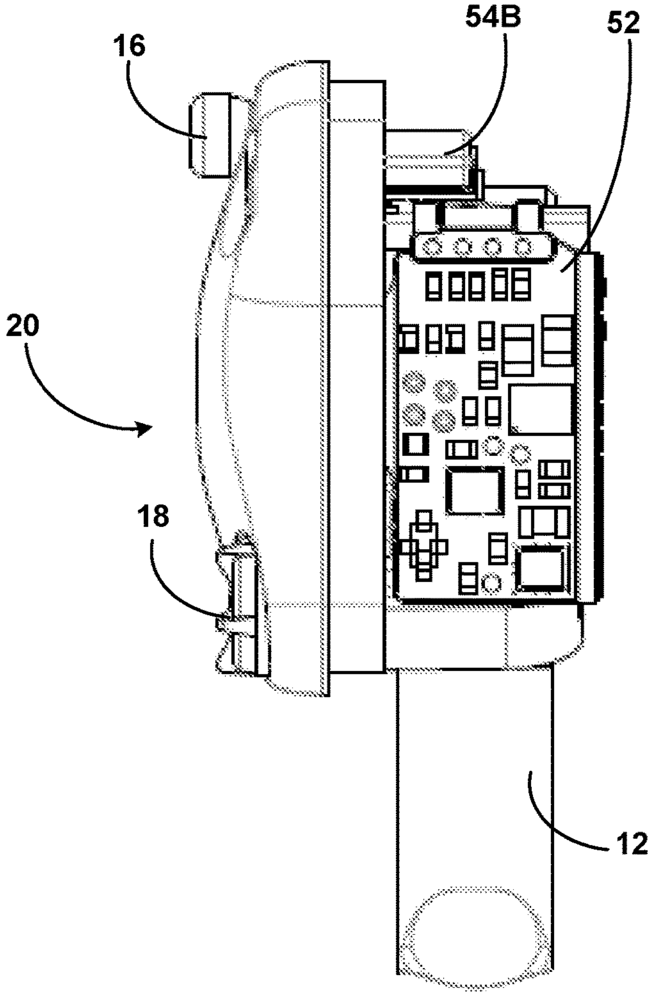
Figure 18:
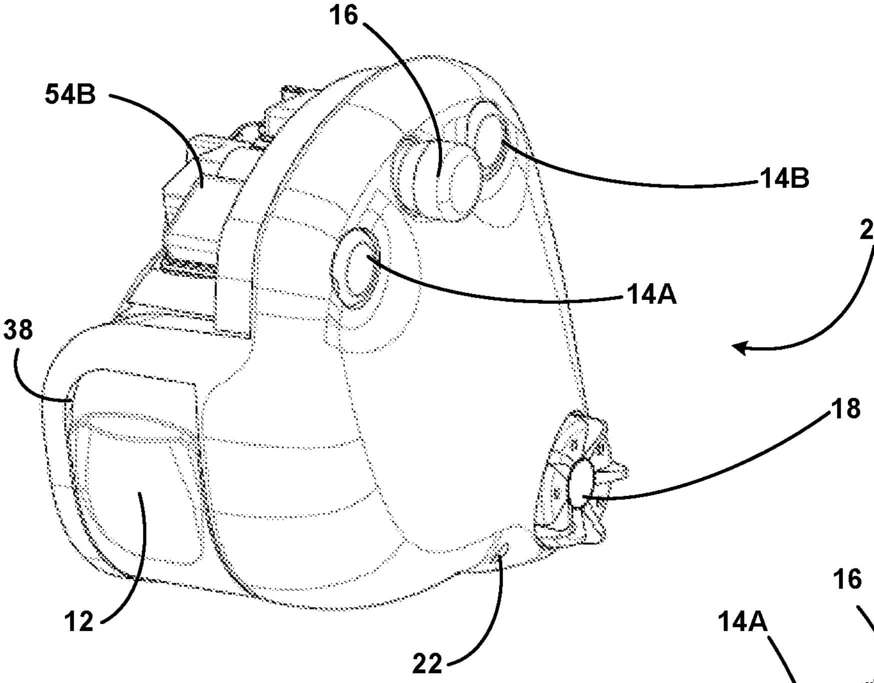
FIGS. 18 and 19 are perspective views of a hearing instrument consistent with this disclosure.
Figure 19:
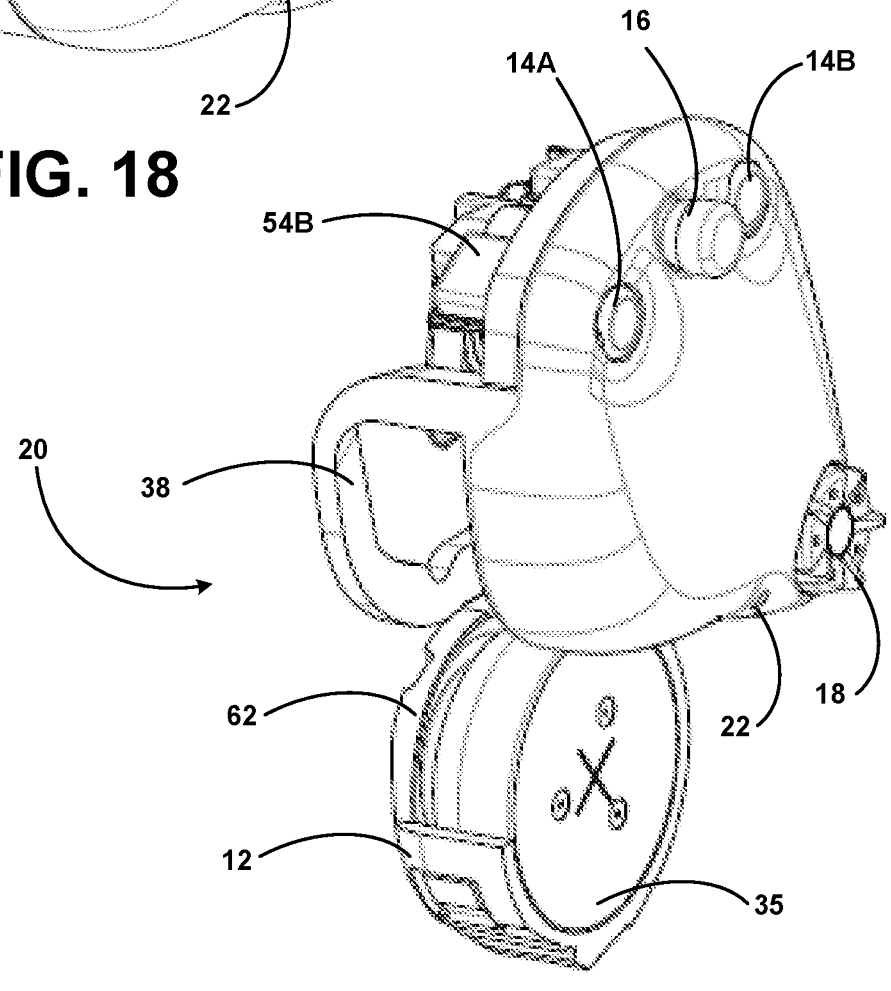

As shown in FIGS. 8 and 19, battery door 12 is configured to open laterally relative to a front surface of hearing instrument 10. Battery door 12 also opens laterally relative to a planar surface of antenna 50, and battery door 12 is positioned along an edge of hearing instrument 10. This edge positioning of battery door 12 can facilitate battery insertion behind antenna 50 relative to front surface of hearing instrument 10. Such features are desirable for a compact and ergometric design, while also ensuring that antenna 50 is positioned as far out as possible relative to the user, which can help improve antenna performance.

In some examples, a housing 40 of hearing instrument 10 may comprise a multi-piece construction. A first piece of housing 40 includes the outer side 20 and battery door 12. Battery door 12 may be disposed in a specific location 44 to ensure that the battery is positioned behind an antenna, e.g., behind in the Z-axis direction relative to a front surface of hearing instrument 10. A second piece of housing 40 defines the inner side 30 and is formed to conform with the user anatomy. The first piece and the second piece are affixed to form housing 40 of hearing instrument 10.

The shape of the inner side 30 of hearing instrument 10 may conform with user anatomy for placement inside the ear of a user such that hearing instrument 10 is generally oriented as shown in FIG. 1 when being worn by the user. The inner side 30 may be formed using injection molding, three-dimensional (3D) printing, or other fabrication techniques, based on a scan or mold of the ear of the user. Accordingly, hearing instrument 10 only fits inside the ear of the user in the general orientation shown in FIG. 1 due to the shape of the ear of the user and the conforming shape of inner side 30 of hearing instrument 10.

Again, battery door 12 may be disposed at a specific location 44 that is proximate a posterior portion of the ear of the user and outside of a concha. When placed in the user's ear, a front side 46 of the outer side 20 may be positioned proximate to the tragus of the user without extending beyond the tragus. Thus, the front side 46 of the outer side 20 may be positioned inside the bowl of the ear, while location 44 may extend from the bowl.

The first piece that defines inner side 30 of hearing instrument 10 and the second piece that defines outer side 20 of hearing instrument 10 can be formed to define sufficient thickness for housing 40 within the bowl of the ear so that when hearing instrument 10 is worn by the user, battery door 12 is positioned outside of a concha such that battery door 12 can be opened and closed without being blocked by an antihelix portion of the ear of the user.

As further shown in various FIGS., hearing instrument 10 may further comprise a pin 22 positioned in housing 40 perpendicular to antenna 50 to facilitate attachment of battery door 12 to housing 40. In some examples, pin 22 may be positioned perpendicular to a major plane defined by an interface between outer side 20 and inner side 30 of hearing instrument 10. Pin 22 defines a hinge for opening and closing the battery door 12. In some examples, battery door

12 is positioned within a slot 38 formed along an edge of housing 40 and attached to the outer side 20 of housing 40, wherein the edge is perpendicular to the antenna 50. Slot 38 may define a sufficient offset thickness 60 (shown in FIG. 13) to ensure structural integrity and to ensure that when hearing instrument 10 is worn by the user, the battery door 12 is positioned outside of a concha such that battery door 12 can be opened and closed without being blocked by an antihelix portion of the ear of the user. The desired thickness of hearing instrument 10 proximate battery door 12 inside the bowl of the ear may be defined by offset 60 and any additional thickness added when the inner side 30 is affixed to outer side 20.

Figure 20:
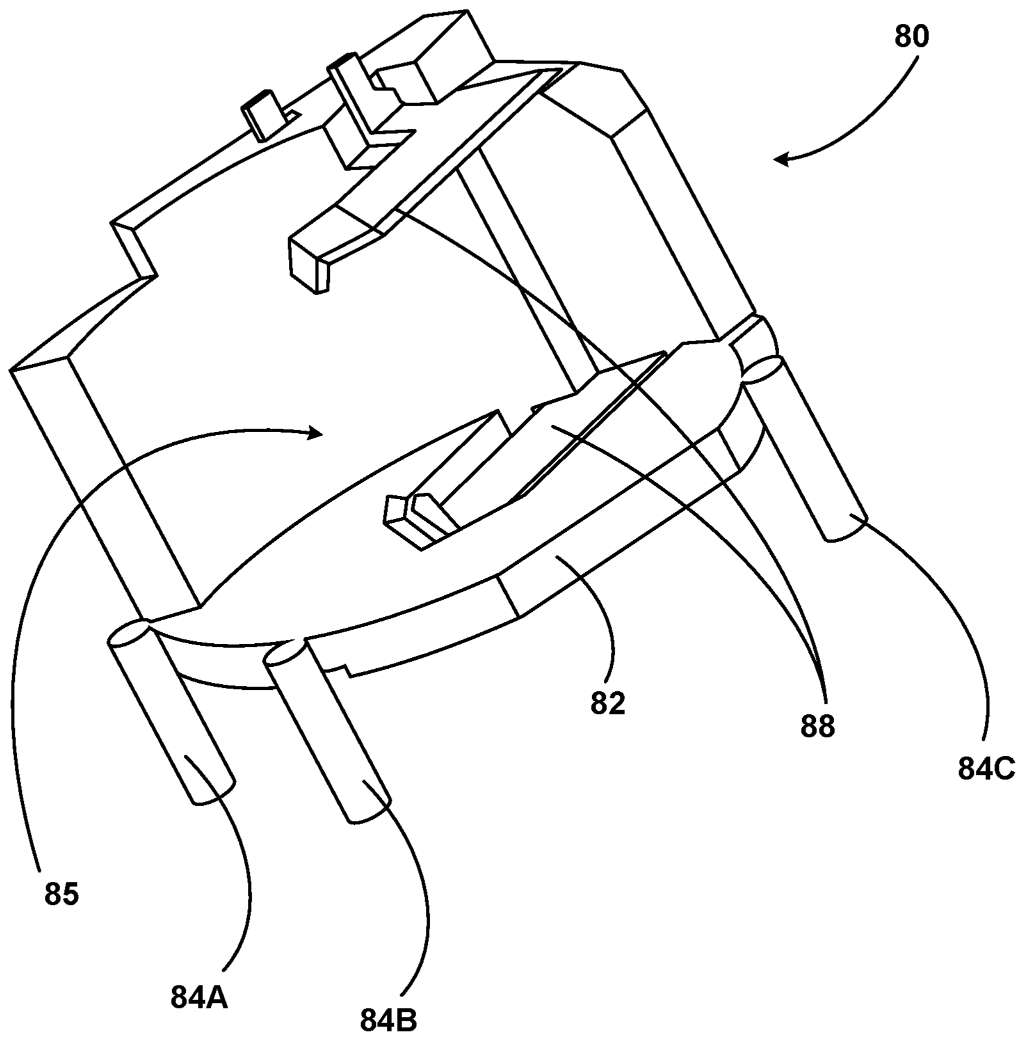
FIG. 20 is a perspective view of a structural insert and a conductor consistent with this disclosure.

In some examples, hearing instrument 10 may further include additional elements inside housing 40 to help accommodate battery 35 and provide structural support on integrity to housing 40 or components inside of housing 40. FIG. 20, for example shows a structural insert 80, which may be designed for such purposes. In particular, hearing instrument 10 may comprise structural insert 80 disposed within the cavity, wherein the structural insert is formed with a shape 85 to hold battery 35 within the cavity of housing 40 when battery door 12 is closed. A conductor 88 may be positioned within structural insert 80. Conductor 88 is formed to provide electrical connections to an anode and a cathode of battery 35. Conductor 88 may be connected to the PCBA so that power from battery 12 can supply PCBA and various other components attached to the PCBA, such as microphones 54A, 54B.

Figure 21:
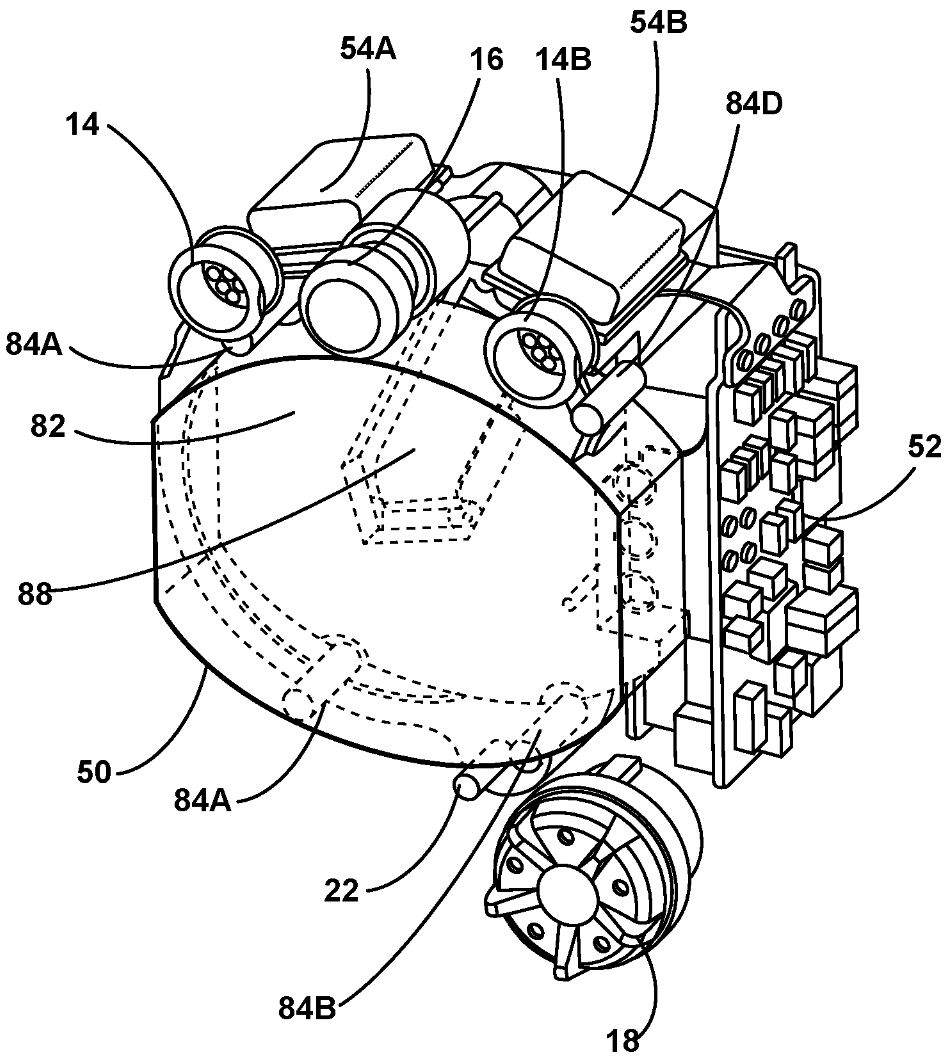
FIG. 21 is a perspective view of various components of a hearing instrument consistent with this disclosure.

As further shown in FIGS. 20 and 21, structural insert 80 may include a plurality of pillars 84A, 84B, 84C, 84D extending from a body 82 of structural insert 80. Pillars 84A, 84B, 84C, 84D may extend inside the cavity of hearing instrument 10 towards the outer side 20 of housing 40. In some examples, pillars 84A, 84B, 84C, 84D provide structural retention for antenna 50, such as by surrounding the perimeter of antenna 50 or by providing a structural backing for antenna 50. In some examples, pillars 84A, 84B, 84C, 84D may also provide structural support to housing 40, such as by contacting or mating with an inner surface of outer side 20 of housing 40.

Hearing instrument 10 may implement a variety of features that help a user hear better, and these features may be performed by one or more circuits in PCBA 52. For example, hearing instrument 10 may amplify the intensity of incoming sound, amplify the intensity of certain frequencies of the incoming sound, or translate or compress frequencies of the incoming sound. In another example, hearing instrument 10 may implement a directional processing mode in which hearing instrument 10 selectively amplifies sound originating from a particular direction (e.g., to the front of the user) while potentially fully or partially canceling sound originating from other directions. In other words, a directional processing mode may selectively attenuate off-axis unwanted sounds. The directional processing mode may be a selectable feature selected via function key 18 and may help users understand conversations occurring in crowds or other noisy environments. In some examples, hearing instrument 10 may use beamforming or directional processing cues to implement or augment directional processing modes.

In some examples, hearing instrument 10 may be configured to reduce noise by canceling out or attenuating certain frequencies. Furthermore, in some examples, hearing instruments 10 may allow a user to enjoy audio media, such as music or sound components of visual media, by outputting sound based on audio data wirelessly transmitted to hearing instrument 10 from another device, such as a cellphone, a tablet computer, a media device, another type of computer, or another extremal source.

Hearing instrument 10, in some examples, may be configured to communicate with another hearing instrument, such as for communication between hearing instruments positioned in a user's left ear and right ear. For instance, in any of the examples of this disclosure, hearing instrument 10 may communicate with another device (such as another hearing instrument) using one or more wirelessly communication technologies. Example types of wireless communication technology include Near-Field Magnetic Induction (NFMI) technology, a 2.4 GHz technology, a BLUETOOTH™ technology, a WI-FI™ technology, audible sound signals, ultrasonic communication technology, infrared communication technology, an inductive communication technology, or another type of communication that does not rely on wires to transmit signals between devices. As mentioned, in some examples, hearing instrument 10 uses a 2.4 GHz frequency band for wireless communication, in which case a planar antenna may be desirable and the layout and design of hearing instrument 10, as described herein, may provide advantages relative to hearing devices that place an antenna in a different location. In some examples of this disclosure, hearing instrument 10 may also communicate with other devices via non-wireless communication links (e.g., in addition to wireless communication links), such as via one or more cables, direct electrical contacts, or other connections not shown in the FIGS.

PCBA 52 may comprise one or more components, such as one or more processors, one or more storage devices, one or more communication unit(s), one or more receivers, one or more transmitters, one or more circuits for or connections to microphones 54A, 54B, one or more sensors, connections to battery 35, and one or more communication channels, or other elements. The communication channels may provide communication between storage devices, communication unit(s), receivers(s), transmitter(s), processor(s), a microphone(s) 54A, 54B, and sensor(s). These or other components may draw electrical power from battery 35.

In some examples, one or more sensors on PCBA 52 may comprise or define an inertial measurement unit (IMU) that is configured to generate data regarding the motion of hearing instrument 10. An IMU on PCBA 52, for example, may include a set of sensors. In some examples, an IMU on PCBA 52 comprises one or more of accelerometers, a gyroscope, a magnetometer, combinations thereof, and/or other sensors for determining the motion of hearing instrument 10. Hearing instrument 10 may also include other sensors, such as a photoplethysmography (PPG) sensor, blood oximetry sensors, blood pressure sensors, electrocardiograph (EKG) sensors, body temperature sensors, electroencephalography (EEG) sensors, environmental temperature sensors, environmental pressure sensors, environmental humidity sensors, skin galvanic response sensors, and/or other types of sensors.

In some examples, PCBA 52 may further include one or more storage devices for storing data. Storage devices on PCBA 52 may comprise volatile memory and/or non-volatile memory. Examples of volatile memories may include random access memories (RAM), dynamic random access memories (DRAM), static random access memories (SRAM), and other forms of volatile memories known in the art. Examples of non-volatile memory configurations may so-called flash memory, or forms of electrically programmable memories (EPROM) or electrically erasable and programmable (EEPROM) memories.

In some examples, PCBA 52 may further include one or more communication unit(s), which may enable hearing instrument 10 to send data to and receive data from one or more other devices, such as another hearing instrument, an accessory device, a mobile device, or another types of device. Communication unit(s) may enable hearing instrument 10 using wireless or non-wireless communication technologies. For instance, communication unit(s) enable hearing instrument 10 to communicate using one or more of various types of wireless technology, such as a BLUETOOTH™ technology, 3G, 4G, 4G LTE, 5G, ZigBee, WI-FI™, Near-Field Magnetic Induction (NFMI), ultrasonic communication, infrared (IR) communication, or another wireless communication technology. In some examples, communication unit(s) on PCBA 52 may enable hearing instrument 10 to communicate using a cable-based technology, such as a Universal Serial Bus (USB) technology. Communication unit(s) may include radio transceivers. The antenna described herein may be used to facilitate one or more types of wireless communication.

Hearing instrument 10 may also comprise one or more speakers for generating audible sound. Microphone(s) 34A, 34B may detect incoming sound and based on the detected sound, PCBA may be configured to generate one or more electrical signals (e.g., an analog or digital electrical signal) representing the incoming sound.

One or more processor(s) on PCBA 52 may comprise processing circuits configured to perform various activities. For example, processor(s) may process the signals generated by microphone(s) 34A, 34B to enhance, amplify, or cancel-out particular channels within the incoming sound. Processor(s) may then cause a receiver on PCBA to generate output signals based on the processed signal and output such output signals to one or more speakers to create audio output by hearing instrument 10. In some examples, processor(s) may include one or more digital signal processors (DSPs). As mentioned, additional PCBAs may also be included within hearing instrument 10 to provide interfaces to PCBA 52 or to distribute components among several PCBAs within the limited area inside housing 50.

Figure 22:
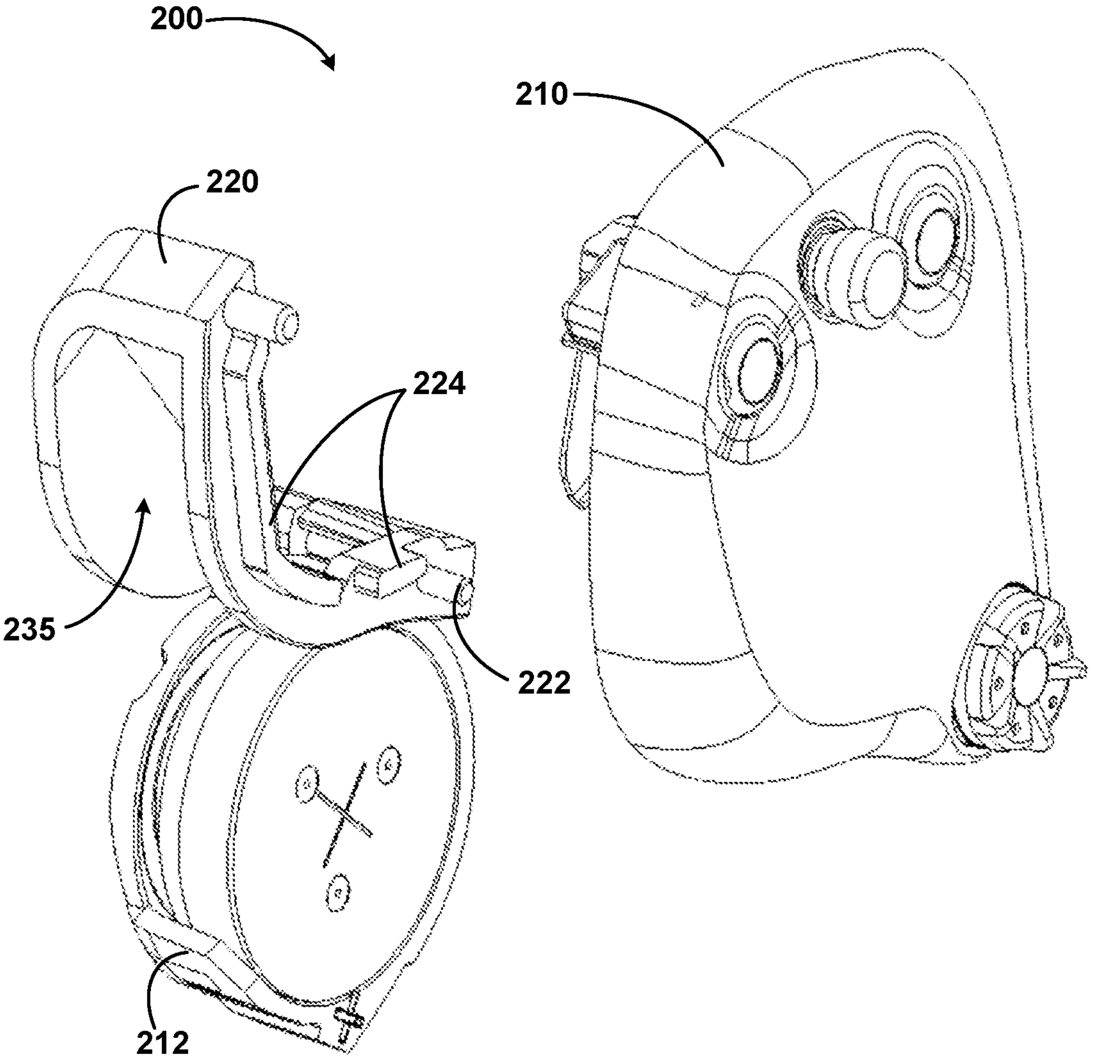
FIGS. 22 and 23 are perspective views showing another example of an outer side of a hearing instrument, where a door frame part is a separate part assembled into the outer side of the hearing instrument.
Figure 23:
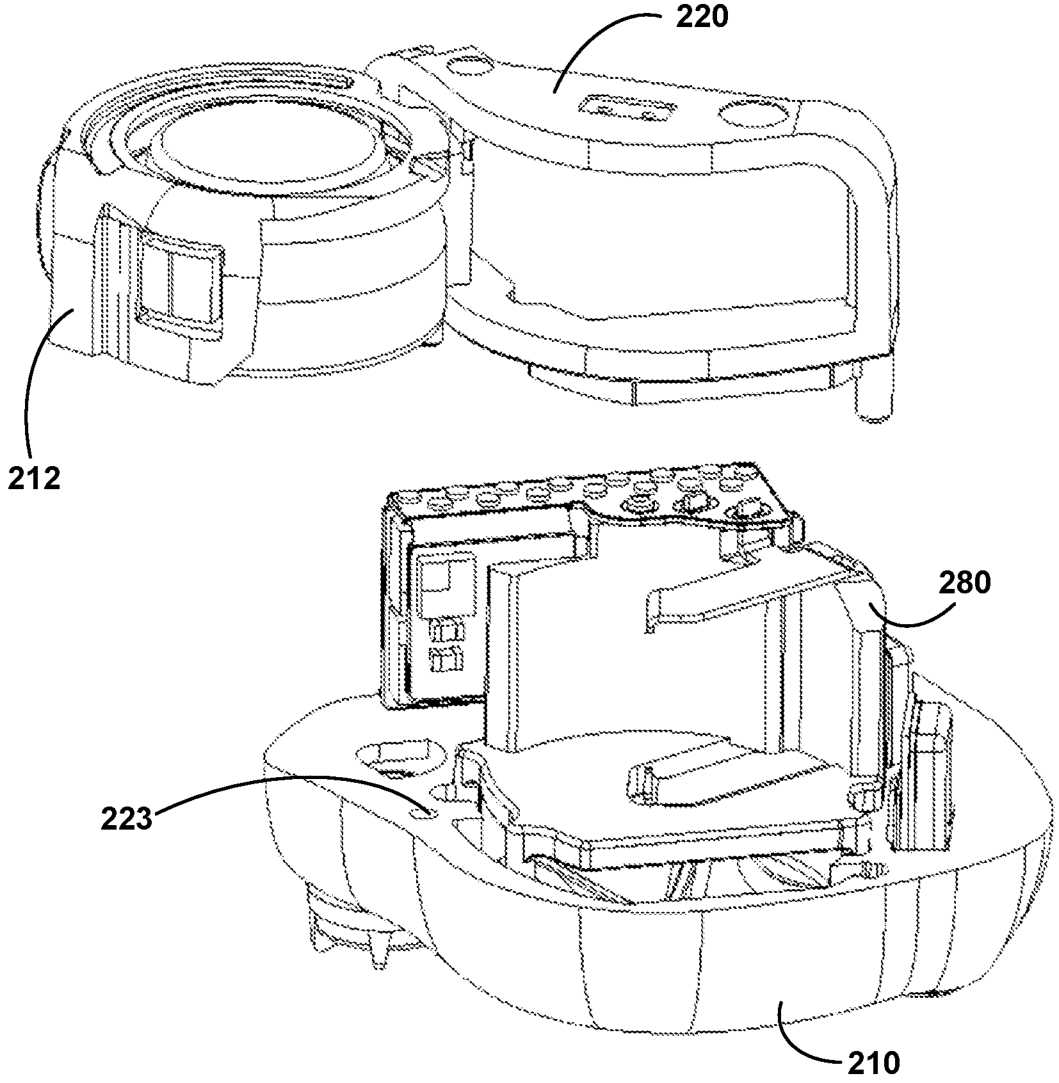

FIGS. 22 and 23 are perspective views showing another example of an outer side 200 of a hearing instrument, where a door hinge element is a separate part 220 that is assembled with a first part 210 so as to define the outer side 200 of the hearing instrument. Referring back to FIGS. 1-8, as set forth above, housing 40 of hearing instrument 10 may comprise a multi-piece construction. For example, as described above, a first piece of housing 40 includes the outer side 20 and battery door 12. Battery door 12 may be disposed in a specific location 44 to ensure that the battery is positioned behind an antenna, e.g., behind in the Z-axis direction relative to a front surface of hearing instrument 10. A second piece of housing 40 defines the inner side 30 and is formed to conform with the user anatomy. The first piece and the second piece are affixed to form housing 40 of hearing instrument 10.

Consistent with this multi-piece construction of hearing instrument 10 described in FIGS. 1-8 above, in some examples, outer side 20 may correspond to outer side 200 shown in FIGS. 22 and 23. In this case, outer side 200 defines a first piece of the housing that itself includes at least two separate parts that are assembled to form the first piece. In particular, a first part 210 defines the outer side and a second part 220 is attached to the first part 210 so as to define a slot 235 in the outer side 200 for the battery door 212. Second part 220, for example, may comprise a door frame for battery door 212.

The door frame, i.e., second part 220, may include attachment features 224 for mating with corresponding features of first part 210. First part 210 and second part 220 may fit together via snap fit, friction fit, crushed-rib fit, or in other mechanical ways. Moreover, in this example, hinge pin 222 may define a hinge and attachment mechanism for battery door 212 that is housed within the housing. Hinge pin 222 may fit into a corresponding hinge hole 223 on an interior surface of first part 210. Thus, unlike the examples above, where a pin 22 is exposed to the exterior surface of the outer surface of the hearing instrument 10, in the example of FIGS. 22 and 23, hinge pin 222 is housed entirely within the housing and is not exposed to the exterior surface of the outer side of the hearing instrument, which can help eliminate exterior debris from affecting the rotation of battery door 212 at hinge pin 222. FIG. 22 also shows a structural insert 280, which may correspond to structural insert 80 shown in FIG. 20 and described above.

Forming the door frame via a second part 220 can improve the moldability, strength, and repairability of a hearing instrument relative to a product that includes a fully molded outer surface that has a floating part off the faceplate to define the location of the door. In general, moldability of both first part 210 and second part 220 can help to mitigate risk of cosmetic or structural problems. Moreover, by making second part 220 separate from first part 210, this may allow for an increase in the thickness of second part and possibly the use of a separate (stronger) material for second part 220 relative to first part 210 to promote better door frame strength. In some cases, second part 210 is detachable from first part 210 for easier and nondestructive repairability of the hearing instrument. If first part 210 is damaged, for example, first part 210 can be replaced without fully replacing the entire faceplate, e.g., without replacing the entire outer side 200.

In this disclosure, ordinal terms such as "first," "second," "third," and so on, are not necessarily indicators of positions within an order, but rather may be used to distinguish different instances of the same thing. Examples provided in this disclosure may be used together, separately, or in various combinations. Furthermore, with respect to examples that involve personal data regarding a user, it may be required that such personal data only be used with the permission of the user.

The following clauses may demonstrate one or more aspects of the disclosure.

Clause 1—A hearing instrument comprising: a housing that defines a cavity, wherein the housing includes an inner side that is formed to conform with user anatomy, an outer side that is externally visible when the hearing instrument is placed within an ear of a user; circuitry disposed inside the cavity, wherein the circuitry includes an antenna disposed adjacent an inner surface of the outer side of the housing; and a battery door formed in the housing, wherein the battery door is positioned such that a battery can be inserted and removed via the battery door, wherein upon insertion of the battery into the hearing instrument, the battery is disposed behind the antenna relative to the outer side of the housing.

Clause 2—The hearing instrument of clause 1, wherein when the inner side of the hearing instrument is placed within the ear of the user, the battery door is disposed proximate a posterior portion of the ear of the user and outside of a concha.

Clause 3—The hearing instrument of clause 1 or 2, further comprising: one or more microphone input ports disposed near a top side of the outer side of the housing.

Clause 4—The hearing instrument clause 3, wherein the circuitry includes: a printed circuit board assembly (PCBA) that includes one or more functional circuits, wherein the PCBA is disposed within the cavity perpendicular to the antenna, wherein the antenna is electrically connected to the PCBA and the battery provides power to the PCBA when the battery is inserted into the cavity via the battery door; and one or more microphones disposed within the cavity behind the one or more microphone input ports, wherein the one or more microphones are electrically connected to the PCBA.

Clause 5—The hearing instrument of any of clauses 1-4, further comprising: a functional button disposed near the top side of the outer side of the housing; and a volume control dial disposed near a bottom side of the outer side of the housing.

Clause 6—The hearing instrument of any of clauses 1-5, wherein the battery door comprises a tray and the battery can be positioned in the tray when the battery door is opened.

Clause 7—The hearing instrument of any of clauses 1-6, wherein the housing comprises a multi-piece construction, wherein a first piece of the housing includes the outer side and the battery door, wherein a second piece of the housing defines the inner side that is formed to conform with the user anatomy, and wherein the first piece and the second piece are affixed to form the housing.

Clause 8—The hearing instrument of clause 7, wherein first piece and the second piece are formed to define sufficient thickness for the housing so that when the hearing instrument worn by the user, the battery door is positioned outside of a concha.

Clause 9—The hearing instrument of clause 7, wherein the first piece includes at least two separate parts that are assembled to form the first piece, wherein a first part defines the outer side and a second part is attached to the first part so as to define a door frame for the battery door.

Clause 10—The hearing instrument of any of clauses 1-9, further comprising a pin positioned in the housing perpendicular to the antenna, wherein the pin defines a hinge for opening and closing the battery door.

Clause 11—The hearing instrument of any of clauses 1-10, further comprising: a structural insert disposed within the cavity, wherein the structural insert is formed to hold the battery within the cavity of the housing when the battery door is closed.

Clause 12—The hearing instrument of clause 11, wherein the circuitry includes a printed circuit board assembly (PCBA), the hearing instrument further comprising: a conductor positioned within the structural insert, wherein the conductor is formed to provide electrical connections to an anode and a cathode of the battery and wherein the conductor is further connected to the PCBA.

Clause 13—The hearing instrument of clause 11 or 12, wherein the structural inert includes a plurality of pillars extending from a body of the structural insert inside the cavity towards the outer side of the housing, wherein the pillars provide structural retention for the antenna.

Clause 14—The hearing instrument of clause 13, wherein the pillars provide structural support to the housing.

Clause 15—The hearing instrument of any of clauses 1-14, wherein the battery door is positioned within a slot formed along an edge of the housing and formed within the outer side of the housing, wherein the edge is perpendicular to the antenna.

Clause 16—The hearing instrument of any of clauses 1-15, wherein the antenna defines a planar shape.

Clause 17—The hearing instrument of clause 16, wherein the antenna comprises a planar inverted-F antenna (PIFA).

Clause 18—The hearing instrument of clause 17, wherein the antenna is configured to send or receive wireless signals in a frequency band that includes 2.4 Gigahertz.

Clause 19—A hearing instrument comprising: a housing that defines a cavity, wherein the housing includes an inner side that is formed to conform with user anatomy, an outer side that is externally visible when the hearing instrument is placed within an ear of a user; one or more microphone input ports disposed near a top side of the outer side of the housing; a functional button disposed near the top side of the outer side of the housing; a volume control dial disposed near a bottom side of the outer side of the housing; circuitry disposed inside the cavity, wherein the circuitry includes a planar antenna disposed adjacent an inner surface of the outer side of the housing, and a printed circuit board assembly (PCBA) that includes one or more functional circuits, wherein the PCBA is disposed within the cavity perpendicular to the antenna, wherein the planar antenna is electrically connected to the PCBA; one or more microphones disposed within the cavity behind the one or more microphone input ports, wherein the one or more microphones are electrically connected to the PCBA; and a battery door attached to the housing and configured to open laterally from an edge of the hearing instrument, wherein the edge is disposed perpendicular to the planar antenna, wherein the battery door is positioned such that a battery can be inserted and removed via the battery door, wherein upon insertion of the battery into the hearing instrument, the battery is disposed behind the planar antenna relative to the outer side of the housing, and wherein the battery provides power to the PCBA when the battery is inserted into the cavity via the battery door.

Clause 20—The hearing instrument of clause 19, further comprising: a structural insert disposed within the cavity, wherein the structural insert is formed to hold the battery within the cavity of the housing when the battery door is closed.

Clause 21—The hearing instrument of clause 20, further comprising: a conductor positioned within the structural insert, wherein the conductor is formed to provide electrical connections to an anode and a cathode of the battery and wherein the conductor is further connected to the PCBA.

Clause 22—The hearing instrument of any of clauses 19-21, wherein the battery door comprises a tray and the battery can be positioned in the tray when the battery door is opened.

Various examples have been described. These and other examples are within the scope of the following claims.

What is claimed is:

1. A hearing instrument comprising:
- a housing that defines a cavity, wherein the housing includes an inner side that is formed to conform with user anatomy, and an outer side that is externally visible when the hearing instrument is placed within an ear of a user;
- a structural insert disposed within the cavity;
- circuitry disposed inside the cavity, wherein the circuitry includes an antenna disposed adjacent an inner surface of the outer side of the housing; and
- a battery door attached to the housing, wherein the battery door is positioned such that a battery can be inserted and removed via the battery door, wherein upon insertion of the battery into the hearing instrument, the battery is disposed behind the antenna relative to the outer side of the housing, wherein the structural insert is formed to hold the battery within the cavity of the housing when the battery door is closed, wherein the structural insert includes a plurality of pillars extending from a body of the structural insert inside the cavity towards the outer side of the housing, and wherein the pillars provide structural retention for the antenna.

2. The hearing instrument of claim 1, wherein when an inner side of the hearing instrument is placed within the ear of the user, the battery door is disposed proximate a posterior portion of the ear of the user and outside of a concha.

3. The hearing instrument of claim 1, further comprising:

one or more microphone input ports disposed near a top side of the outer side of the housing.

4. The hearing instrument of claim 3, wherein the circuitry includes:

a printed circuit board assembly (PCBA) that includes one or more functional circuits, wherein the PCBA is disposed within the cavity perpendicular to the antenna, wherein the antenna is electrically connected to the PCBA and the battery provides power to the PCBA when the battery is inserted into the cavity via the battery door; and wherein the hearing instrument includes one or more microphones disposed within the cavity behind the one or more microphone input ports, wherein the one or more microphones are electrically connected to the PCBA.

5. The hearing instrument of claim 3, further comprising:

a functional button disposed near the top side of the outer side of the housing; and a volume control dial disposed near a bottom side of the outer side of the housing.

6. The hearing instrument of claim 1, wherein the battery door comprises a tray and the battery can be positioned in the tray when the battery door is opened.

7. The hearing instrument of claim 1, wherein the housing comprises a multi-piece construction, wherein a first piece of the housing includes the outer side and the battery door, and wherein a second piece of the housing defines the inner side that is formed to conform with the user anatomy, wherein the first piece and the second piece are affixed to form the housing.

8. The hearing instrument of claim 7, wherein the first piece and the second piece are formed to define sufficient thickness for the housing so that when the hearing instrument is worn by the user, the battery door is positioned outside of a concha.

9. The hearing instrument of claim 7, wherein the first piece includes at least two separate parts that are assembled to form the first piece, wherein a first part defines the outer side and a second part is attached to the first part so as to define a door frame for the battery door.

10. The hearing instrument of claim 1, further comprising a pin positioned in the housing perpendicular to the antenna, wherein the pin defines a hinge for opening and closing the battery door.

11. The hearing instrument of claim 1, wherein the circuitry includes a printed circuit board assembly (PCBA), the hearing instrument further comprising:

a conductor positioned within the structural insert, wherein the conductor is formed to provide electrical connections to an anode and a cathode of the battery and wherein the conductor is further connected to the PCBA.

12. The hearing instrument of claim 1, wherein the pillars provide structural support to the housing.

13. The hearing instrument of claim 1, wherein the battery door is positioned within a slot formed along an edge of the housing and formed within the outer side of the housing, wherein the edge is perpendicular to the antenna.

14. The hearing instrument of claim 1, wherein the antenna defines a planar shape.

15. The hearing instrument of claim 14, wherein the antenna comprises a planar inverted-F antenna (PIFA).

16. The hearing instrument of claim 15, wherein the antenna is configured to send or receive wireless signals in a frequency band that includes 2.4 Gigahertz.

17. A hearing instrument comprising:

a housing that defines a cavity, wherein the housing includes an inner side that is formed to conform with user anatomy, an outer side that is externally visible when the hearing instrument is placed within an ear of a user;

a structural insert disposed within the cavity;

one or more microphone input ports disposed near a top side of the outer side of the housing;

a functional button disposed near the top side of the outer side of the housing;

a volume control dial disposed near a bottom side of the outer side of the housing;

circuitry disposed inside the cavity, wherein the circuitry includes a planar antenna disposed adjacent an inner surface of the outer side of the housing, and a printed circuit board assembly (PCBA) that includes one or more functional circuits, wherein the PCBA is disposed within the cavity perpendicular to the planar antenna, wherein the planar antenna is electrically connected to the PCBA;

one or more microphones disposed within the cavity behind the one or more microphone input ports, wherein the one or more microphones are electrically connected to the PCBA; and a battery door attached to the housing and configured to open laterally from an edge of the hearing instrument, wherein the edge is disposed perpendicular to the planar antenna, wherein the battery door is positioned such that a battery can be inserted and removed via the battery door, wherein upon insertion of the battery into the hearing instrument, the battery is disposed behind the planar antenna relative to the outer side of the housing, and wherein the battery provides power to the PCBA when the battery is inserted into the cavity via the battery door, wherein the structural insert is formed to hold the battery within the cavity of the housing when the batter door is closed, wherein the structural insert includes a plurality of pillars extending from a body of the structural insert inside the cavity towards the outer side of the housing, and wherein the pillars provide structural protection for the planar antenna.

18. The hearing instrument of claim 17, further comprising:

a conductor positioned within the structural insert, wherein the conductor is formed to provide electrical connections to an anode and a cathode of the battery and wherein the conductor is further connected to the PCBA.

19. The hearing instrument of claim 17, wherein the battery door comprises a tray that extends laterally from the edge of the hearing instrument and the battery can be positioned in the tray when the battery door is opened.

* * * * *